United States Patent [19]

Long et al.

[11] Patent Number: 5,293,782
[45] Date of Patent: Mar. 15, 1994

[54] PROCESS AND DEVICE FOR DRIVING A SURFACE IN A RECIPROCATING MOTION IN A PLANE

[75] Inventors: Michael Long, Rochester, N.Y.; Jacques Gaudillat, Chatenoy-En-Bresse, France

[73] Assignee: Eastman Kodak Company, Rochester, N.Y.

[21] Appl. No.: 927,502
[22] PCT Filed: Mar. 11, 1991
[86] PCT No.: PCT/FR91/00192
  § 371 Date: Sep. 17, 1992
  § 102(e) Date: Sep. 17, 1992
[87] PCT Pub. No.: WO91/14886
  PCT Pub. Date: Oct. 3, 1991

[30] Foreign Application Priority Data

Mar. 19, 1990 [FR] France ................. 9003698

[51] Int. Cl.⁵ ............................................. F16H 21/18
[52] U.S. Cl. ............................................. 74/25; 74/68; 74/110; 267/160; 248/619
[58] Field of Search .............. 74/25, 43, 68, 110; 267/160; 248/619

[56] References Cited

U.S. PATENT DOCUMENTS

| | | | |
|---|---|---|---|
| 1,291,524 | 1/1919 | Howell | 83/278 X |
| 2,989,063 | 6/1961 | Clark | 267/160 X |
| 3,130,620 | 4/1964 | Smeets | 83/140 |
| 3,234,840 | 2/1966 | Smeets | 83/559 |
| 3,295,808 | 1/1967 | Webb | 267/160 X |
| 3,453,919 | 7/1969 | Ehrat et al. | 83/589 |
| 3,835,338 | 9/1974 | Martin | 310/8.6 |
| 4,227,450 | 10/1980 | Kreiskorte | 100/214 |
| 4,495,844 | 1/1985 | Jackson et al. | 83/715 |
| 4,920,782 | 5/1990 | Hellwig | 72/451 |

FOREIGN PATENT DOCUMENTS

| | | |
|---|---|---|
| 0128293A1 | 12/1984 | European Pat. Off. . |
| 1031675 | 6/1958 | Fed. Rep. of Germany . |
| WO89/02039 | 3/1989 | PCT Int'l Appl. . |
| 624028 | 9/1978 | U.S.S.R. ................. 74/68 |
| 684933 | 12/1952 | United Kingdom . |

OTHER PUBLICATIONS

IBM Technical Disclosure Bulletin; vol. 22 No. 7; Dec. 1979; "Spatially Linear Motion Device for Printers and Scanners"; W. B. Pennebaker.

Primary Examiner—Allan D. Herrmann
Attorney, Agent, or Firm—Charles E. Snee, III

[57] ABSTRACT

A device and a process are disclosed for driving a moving surface in a reciprocating motion in a plane, and having a magnitude $A_2$. Two parallelograms are provided, which can be distorted in a plane perpendicular to the plane where the motion is carried out. Each of both parallelograms exhibits two parallel sides, one being common to both parallelograms and driven in a reciprocating motion having a displacement $A_1 = A_2/2$, the other parallel side of the first parallelogram being stationary and the other parallel side of the second parallelogram being driven in a reciprocating motion having a displacement $A_2$.

8 Claims, 3 Drawing Sheets

PROCESS AND DEVICE FOR DRIVING A SURFACE IN A RECIPROCATING MOTION IN A PLANE

FIELD OF THE INVENTION

The invention relates to a process for driving a movable surface in a reciprocating motion in a plane. The invention also relates to a device for implementing the process.

BACKGROUND ART

In the field of web perforation, and particularly when very high accuracy is required in positioning the perforations, it is necessary to have such reciprocating motion in a plane. Thus, the French patent application No. 9,003,697 filed Nov. 19, 1990 and entitled Device for Carrying Out an Operation on a Web according to a Given Pitch, corresponding to uncurrently filed, allowed U.S. Ser. No. 07/927,501, describes a device comprising a punch block support arm describing, in an reciprocating manner, a short portion of an arc of a circle around a stationary horizontal axis parallel to the movement axis of the web, so as to be able to cause the punches do cooperate periodically with a die provided on a die block. The punch block support arm is connected to the die block at the level of the stationary horizontal axis, the two blocks connected in this way being driven parallel to the movement axis of the web by a reciprocating movement of a generally identical period to that of the movement of the punch block support arm around the stationary axis. In these perforators, the period of the reciprocating movement can be in the order of 37 ms for a magnitude of approximately 20 mm.

For such devices, combining at the same time speed and accuracy, it is of great importance that the horizontal reciprocating movement be exactly parallel to the plane of the web and that the movement be constantly carried out in the same plane.

In the previous technique, it was known to use crank-connecting rod mechanisms, which could be of the eccentric type, to produce such reciprocating movement, the movement being guided in a same plane by means of suitable sliding mechanisms. For very high frequency reciprocating movements, these mechanisms suffered from quite fast wear, making the guiding movement increasingly inaccurate. Furthermore, such guiding mechanisms often generated jerks in the reciprocating movement. Such jerks are, of course, detrimental to the accuracy of positioning perforations on the web.

SUMMARY OF THE INVENTION

Consequently, one of the objects of this invention is to provide a process making it possible to drive a movable surface with a reciprocating movement in a plane, without employing sliding type guide mechanisms as are used in the previous technique.

Another object of this invention is to provide a device for implementing this process.

Other objects of this invention will appear during the course of the more detailed description which follows.

According to this invention, a structure, which can be distorted, is realised to move, according to a reciprocating movement or displacement of magnitude $A_2$, a surface lying in a first plane comprising, in a plane orthogonal to the first one, two parallelograms, which can be distorted, each having two sides parallel to the first plane, one of these parallel sides being common to the two parallelograms and driven in a second plane, parallel to the first one, by means of a first driving means, by a reciprocating movement or displacement of magnitude $A_1 = A_2/2$, the other parallel side of the two parallelograms being arranged in a third plane, parallel to said first one, said other parallel side of said first parallelogram being stationary, the other parallel side of the second parallelogram being movable and driven in the third plane, by means of a second driving means, by a reciprocating movement of magnitude $A_2$ in phase with the movement of magnitude $A_1$.

According to this invention, a process is also provided for moving, in a reciprocating movement of magnitude $A_2$, a surface arranged in a first plane, comprising the following stages:

a) in a plane orthogonal to the first plane, there are two parallelograms, which can be distorted, each having two sides parallel to the first plane, one of these parallel sides, arranged in a second plane parallel to the first one, being common to the two parallelograms and movable, the other parallel side of the two parallelograms being arranged in a third plane, parallel to the first, the other parallel side of the first parallelogram being stationary, the other parallel side of the second parallelogram being movable, b) a first reciprocating movement in the second plane and having a magnitude $A_1 = A_2/2$ is applied to the common parallel side, c) a second reciprocating movement in the third plane and having a magnitude $A_2$ is applied to the other parallel side of the second parallelogram, the movement of magnitude $A_2$ being in phase with the movement of magnitude $A_1$.

BRIEF DESCRIPTION OF THE DRAWINGS

The invention will be described with reference to the drawings, in which.

DESCRIPTION OF THE PREFERRED EMBODIMENTS

Figure 1:
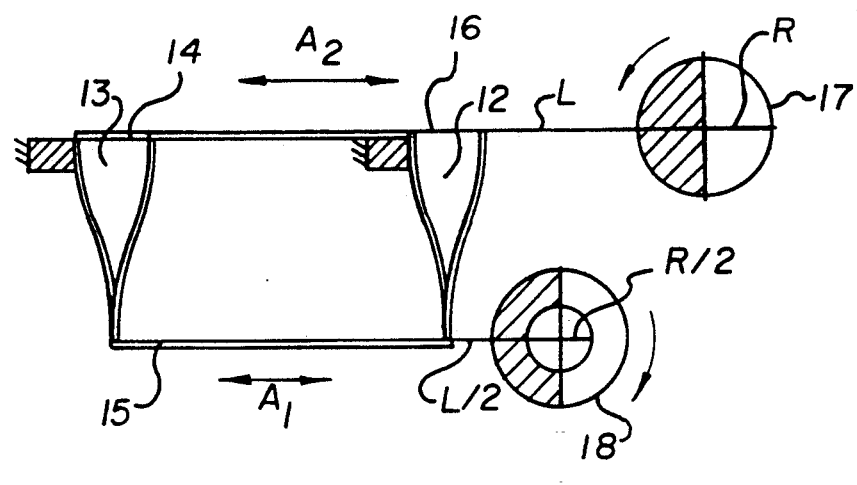
FIG. 1 diagrammatically represents a device according to this invention.

The device in FIG. 1 comprises, in a plane orthogonal to a first plane corresponding to the plane of the movement to be achieved, two parallelograms (12, 13), which can be distorted, of identical height and each having two sides (14, 15; 15, 16) parallel to the first plane. One of these parallel sides (15) is common to the two parallelograms and is driven, in a second plane parallel to the first plane, by a reciprocating movement whose magnitude, $A_1$, is equal to half the magnitude of $A_2$ of the movement to be achieved. The other parallel side (14, 16) of each of the two said parallelograms lies in a third plane. While the other parallel side (14) of the first parallelogram is stationary, that (16) of the second parallelogram is movable and driven in the third plane by a reciprocating movement of magnitude $A_2$ in phase with the movement of magnitude $A_1$. The movable side (16) describing the movement of magnitude $A_2$ is connected to a first crank-connecting rod system in which the radius of the crank is R and the length of the connecting rod is L. The movable side (15) common to the two parallelograms and describing a movement of magnitude $A_1 = A_2/2$ is connected to a second crank-connecting rod system (18) in which the crank radius is R/2 and the length of the connecting rod is L/2, with both cranks turning at the same angular speed, either in phase or in opposite phase. According to a particular embodiment, the ratio R/L is preferably less than 0.25. The other sides of the parallelograms are comprised of a suitable flexible material. By means of such a device, the desired movement, of magnitude $A_2$, is effected always in a same plane, on account of the opposite effects resulting from the movements applied to each of the two the parallel sides. According to a preferred embodiment, the crank-connecting rod mechanisms are eccentric mechanisms.

Figure 2:
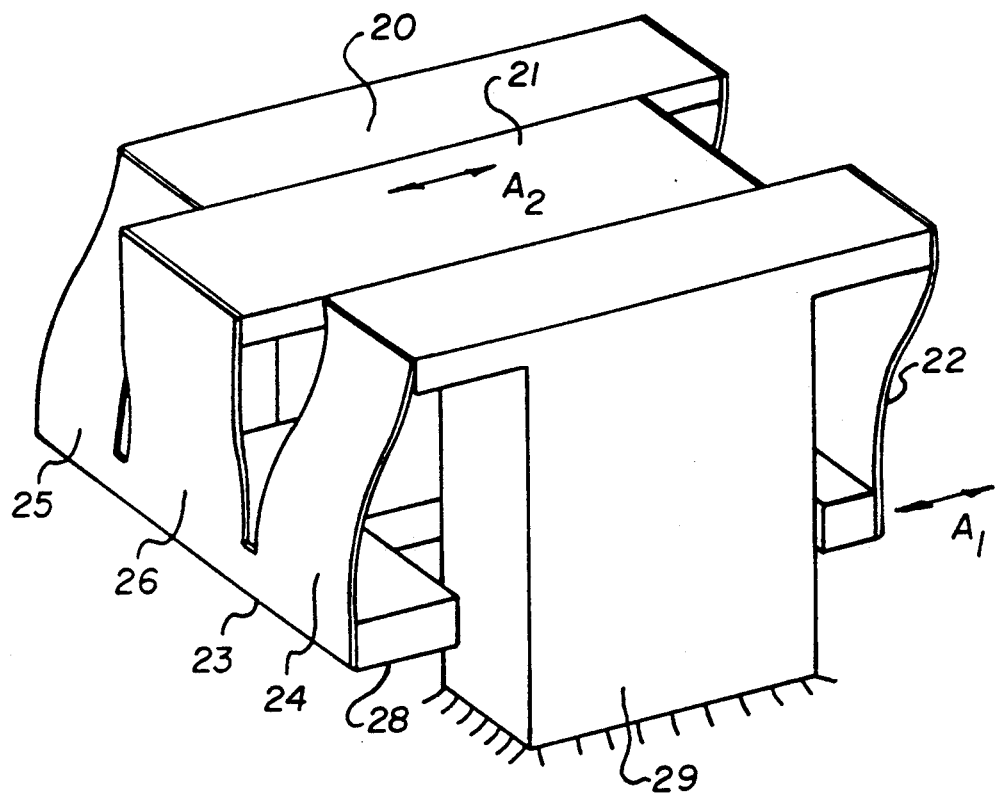
FIG. 2 represents a particular embodiment of the device according to this invention.

With reference to FIG. 2, this illustrates an embodiment of the device according to this invention. According to this embodiment, a support plane (20) is provided, which is designed to be driven by a reciprocating movement of magnitude $A_2$ in the direction represented by the two-directional arrows (21). The device represented in FIG. 2 functions according to the same principle as described with reference to FIG. 1, but it is adapted to support a device such as a perforating device (not represented) and which has to be driven by a reciprocating movement of magnitude $A_2$ in a plane parallel to the plane of the support (20). The device according to this invention comprises two flexible members (22, 23) whose free height, i.e. the effective height, is identical and arranged on both sides of the support (20). Each of the flexible members defines two side blades (24, 25) and one central blade (26). The materials of which the two flexible members are comprised should preferably be of substantially identical nature, the two members being also of substantially identical thickness. The lower ends of the side blades and of the central blade of the first flexible member (23) are coupled to the lower end of the side blades and of the central blade of the second member, respectively, by means of a coupling member (28). According to the embodiment represented in FIG. 2, the coupling member (28) is substantially flat and arranged parallel to the plane of the support (20). This coupling member is arranged in relation to the stationary frame (29) so that it can be at least partially free translationally in the direction of the reciprocating movement to be achieved. The upper ends of the side blades of each of the flexible members are coupled to the frame (29), whilst the upper part of the central blade of each of the members is coupled to the support (20), with the two flexible members arranged in this way defining, when they are not acted upon translationally, two parallel surfaces. According to a particular embodiment, the width of the central blade (26) is equal to the sum of the widths of the side blades (24, 25). By analogy with the system described with reference to FIG. 1, such a device defines two parallelograms arranged in the same way as in the device of FIG. 1, the two parallelograms formed by the side blades being identical and behaving in an identical manner. The support (20) arranged in this way is suitable to move in a plane according to a reciprocating movement of magnitude $A_2$. To this end, the upper part of the central blade of one of the flexible members is coupled to a first crank-connecting rod device (not represented), in which the crank describes a radius R and the connecting rod has a length L, the lower part of said central blade being, for its part, coupled to a second crank-connecting rod device (not represented), in which the crank describes a radius R/2 and the connecting rod has a length L/2, the cranks being driven at the same angular speed, either in phase or in opposite phase. In certain cases, it is desirable to balance the movement achieved. To this end, suitably chosen counterweights are used, and they are arranged in a suitable manner on each of the crank-connecting rod mechanisms (represented by two shaded semi-circles in FIG. 1). Likewise, for reasons of balancing the movement, it is preferable that the axes bearing the counterweights, in contrast to that which is represented in FIG. 1, be situated substantially beneath each other, the parallel side common to the two parallelograms being extended in a suitable manner.

Figure 3:
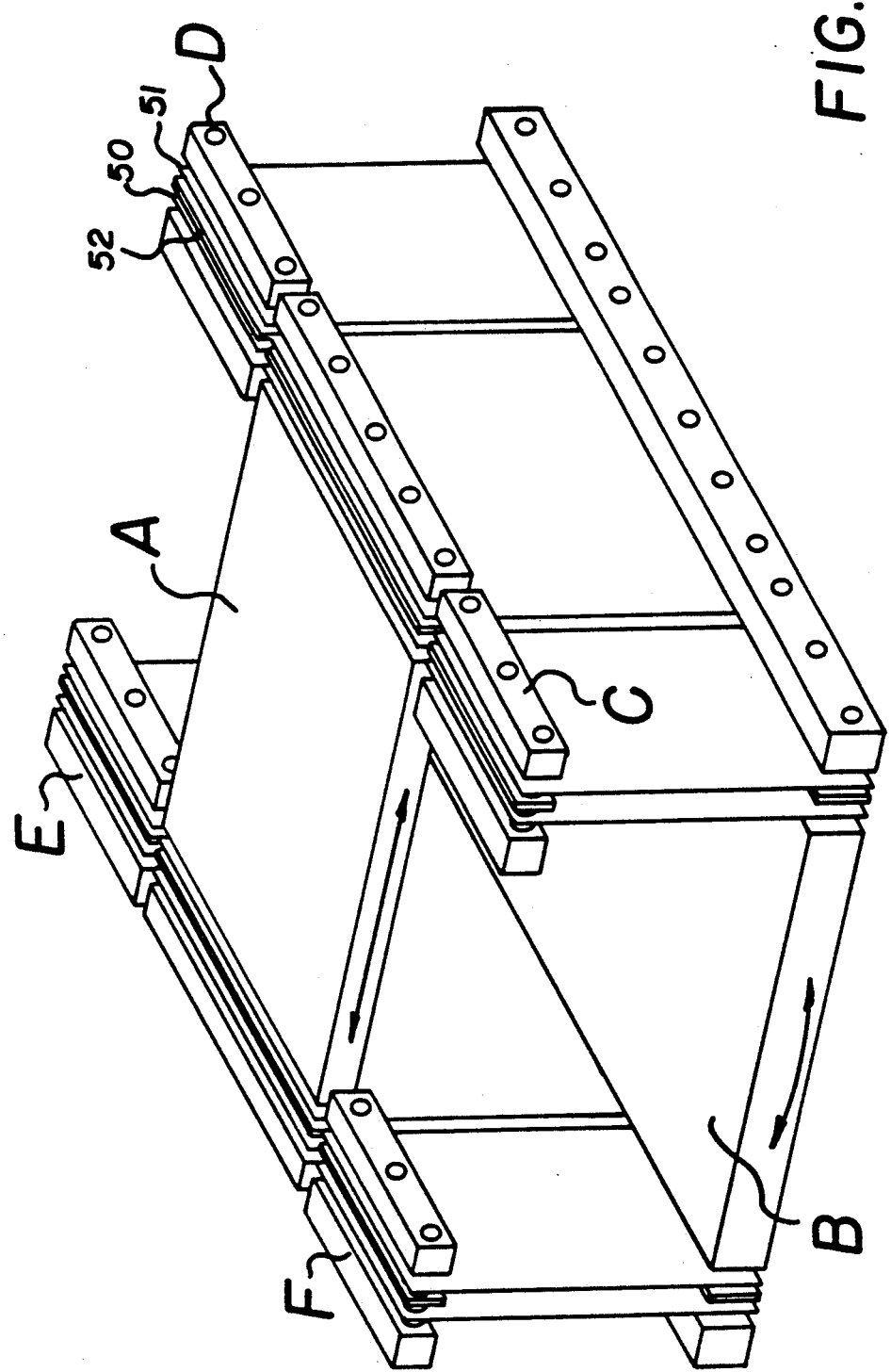
FIG. 3 illustrates an alternative to the particular embodiment shown in FIG. 2.

FIG. 3, to which it is now referred illustrates an alternative to the particular embodiment represented in FIG. 2. According to the same principle as the one described with reference to FIGS. 1 and 2, members C, D, E and F are stationary while the coupling member (B) moves in phase with support A but at half its amplitude. Driving means such as crank connecting rod mechanisms, as those used in the embodiment illustrated in FIG. 2 (not shown) are used in this new embodiment. The single flexible blades 22, 23 of the embodiment shown in FIG. 2 have been replaced by at least two parallel side by side flexibles blades 50, 51, spaced a small distance apart by an appropriate spacing means 52, so that two adjacent flexible blades cannot contact each other. The horizontal, vertical and torsional loads applied to support A will be thus resisted by more than one flexible blade. Thus, for a given stress limit of each flexible blade, the thickness of each flexible blade can be reduced since the load is distributed over multiple flexible blades. This reduction in thickness leads to a proportional decrease in bending stresses for a given horizontal displacement. Such a concept has a plurality of advantages: the allowable displacement of support A will be much greater for a given maximum stress level in the flexible material; the force necessary to displace support A will be much lower for a given horizontal displacement, compared to the one required in the embodiment of FIG. 2; a sudden breaking of one of the flexible blades will not have the catastrophic consequences, for a device disposed on said support A, which would have been caused by the breaking of one of the blades of the FIG. 2 embodiment; in fact according to the embodiment of FIG. 3, if one of the flexible blades breaks suddenly, support A is always maintained in horizontal position, due to the other(s) remaining blades.

We claim:

1. A distortable structure, for moving, according to a reciprocating displacement of magnitude $A_2$, a surface arranged in a first plane, comprising:

in a plane orthogonal to the first plane, two distortable parallelograms (12, 13), each one having two sides parallel to the first plane (14, 15, 16), one of these parallel sides (15) being common to the two parallelograms;

first means for driving the common side in a second plane parallel to the first one according to a reciprocating displacement of magnitude $A_1 = A_2/2$;

the other parallel side )14, 16) of the two parallelograms being arranged in a third plane, parallel to the first one, the other parallel side (14) of the first parallelogram being stationary, the other parallel side (16) of the second parallelogram being movable; and second means for driving the other parallel side of the second parallelogram in said third plane according to a reciprocating displacement of magnitude $A_2$ in phase with the displacement of magnitude $A_1$.

2. A distortable structure, according to claim 1, characterised in that the two other sides of the two parallelograms are comprised of a flexible material.

3. A distortable structure, according to claim 2, characterized in that said two other sides of the two parallelograms are comprised of at least two side by side flexible blades, spaced apart by means of an appropriate spacing means.

4. A distortable structure, according to claim 1, characterised in that the first means for driving comprises a first crank-connecting rod mechanism in which the crank describes a radius $R/2$ and the connecting rod length is $L/2$; and the second means for driving comprises a second crank-connecting rod mechanism in which the crank describes a radius $R$ and the connecting rod length is $L$, the two cranks being driven in rotation, in phase or in opposite phase.

5. A distortable structure, according to claim 4, in which the $R/L$ ratio is less than 0.25.

6. A distortable structure, according to claim 4, characterised in that the first and second crank-connecting rod mechanisms are eccentric.

7. A process for moving, according to a reciprocating displacement of magnitude $A_2$, a surface arranged in a first plane, comprising the steps of:
   a) arranging two distortable parallelograms, in a plane orthogonal to the first plane, each of both parallelograms having two sides parallel to the first plane; one of the two sides, arranged in a second plane parallel to the first one, being common to the two parallelograms and movable; the other of the two sides, being arranged in a third plane parallel to the first one; the other side of the first parallelogram being stationary; the other parallel side of the second being movable;
   b) applying a first reciprocating displacement to the common parallel side in the second plane and having a magnitude $A_1 = A_2/2$; and
   c) applying a second reciprocating displacement to the other parallel side of the second parallelogram in the third plane and having a magnitude $A_2$, the movement of magnitude $A_2$ being in phase with the movement of magnitude $A_1$.

8. Process according to claim 7, wherein the reciprocating displacement of magnitude $A_2$ is realised by means of a first crank-connecting rod mechanism in which the crank describes a radius $R$ and the connecting rod length is and the movement of magnitude $A_1$ is realised by means of a second crank-connecting rod mechanism, in which the crank describes a radius $R/2$ and the connecting rod length is $L/2$, the two cranks being driven in rotation, in phase or in opposite phase.

* * * * *